July 23, 1946.   S. B. PICKLES   2,404,400
RADIO BEACON
Filed Nov. 15, 1943   4 Sheets-Sheet 1

INVENTOR.
SIDNEY B. PICKLES
BY
R P Morris
ATTORNEY

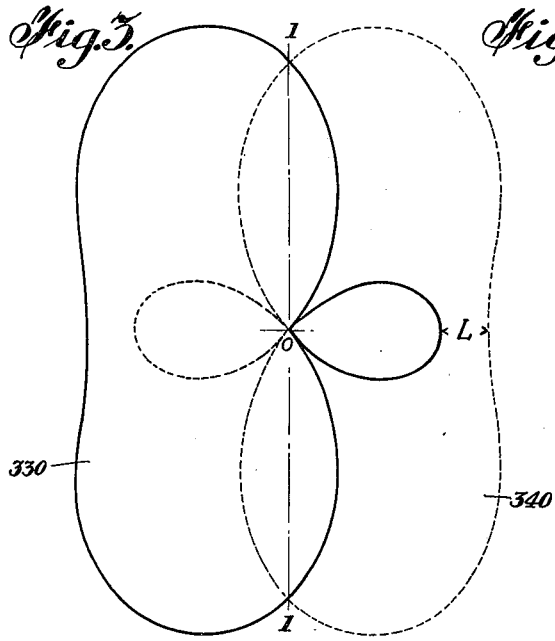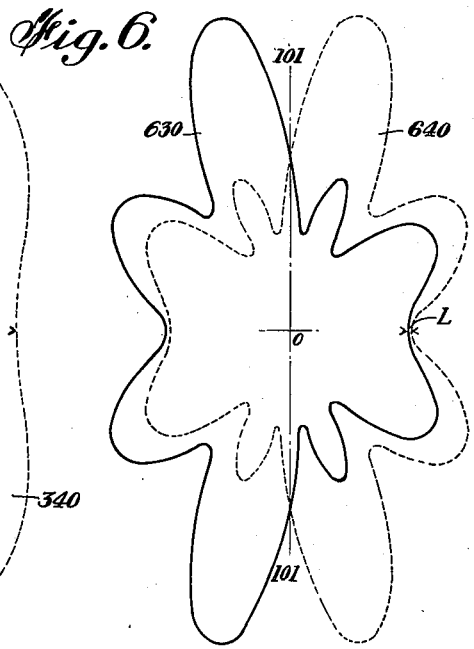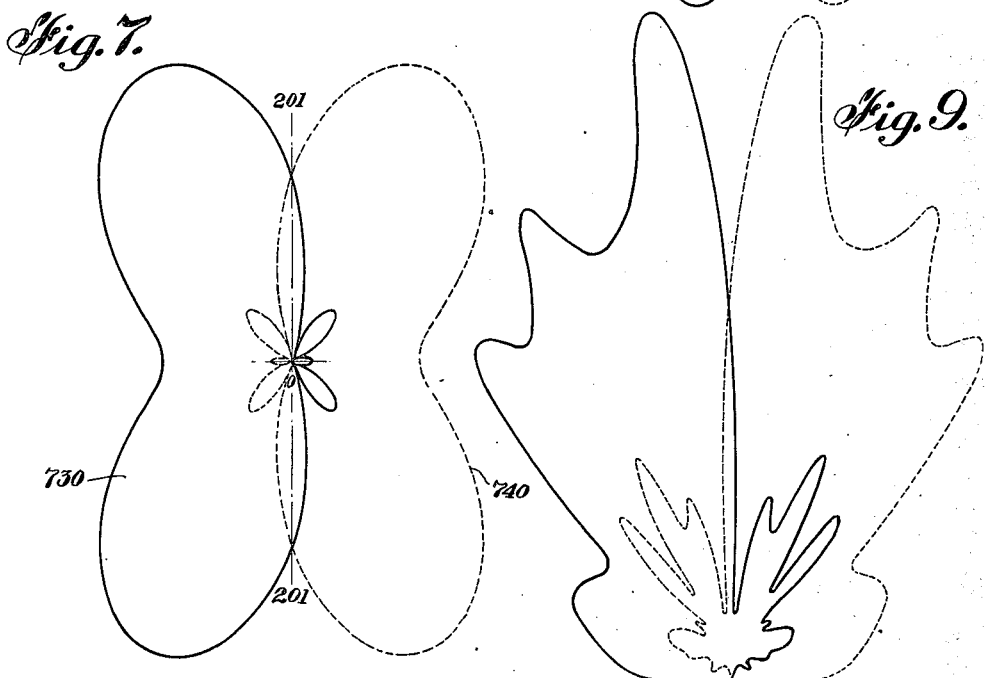

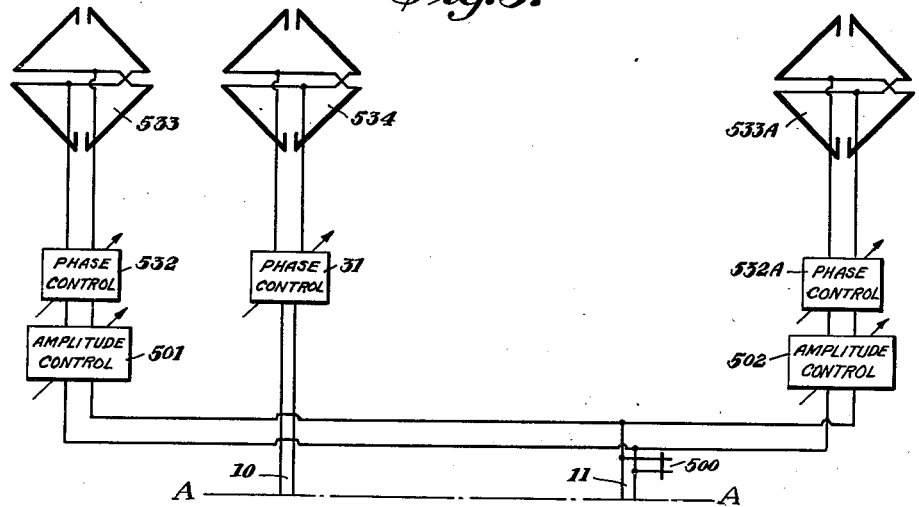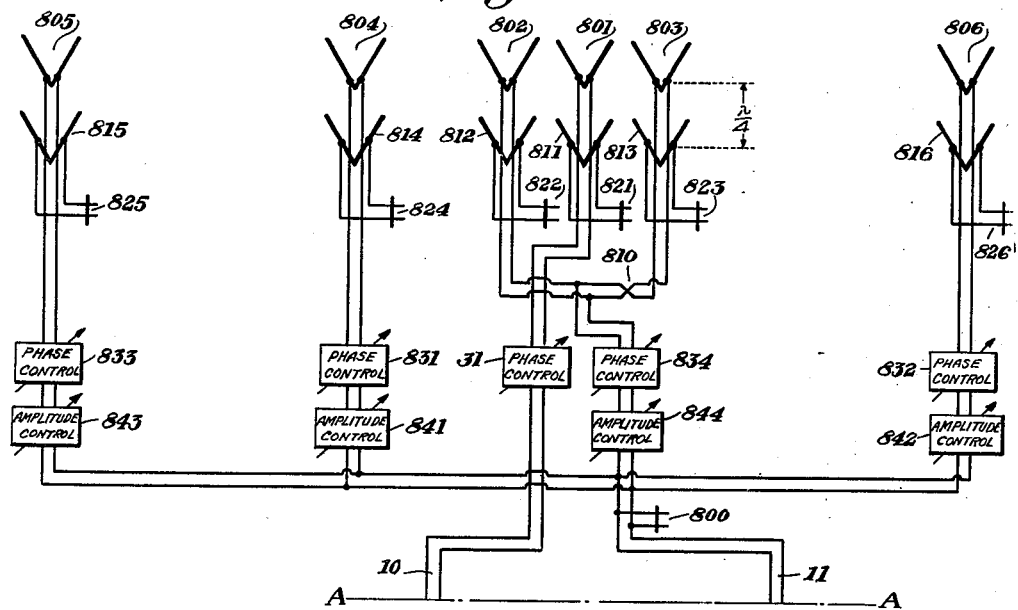

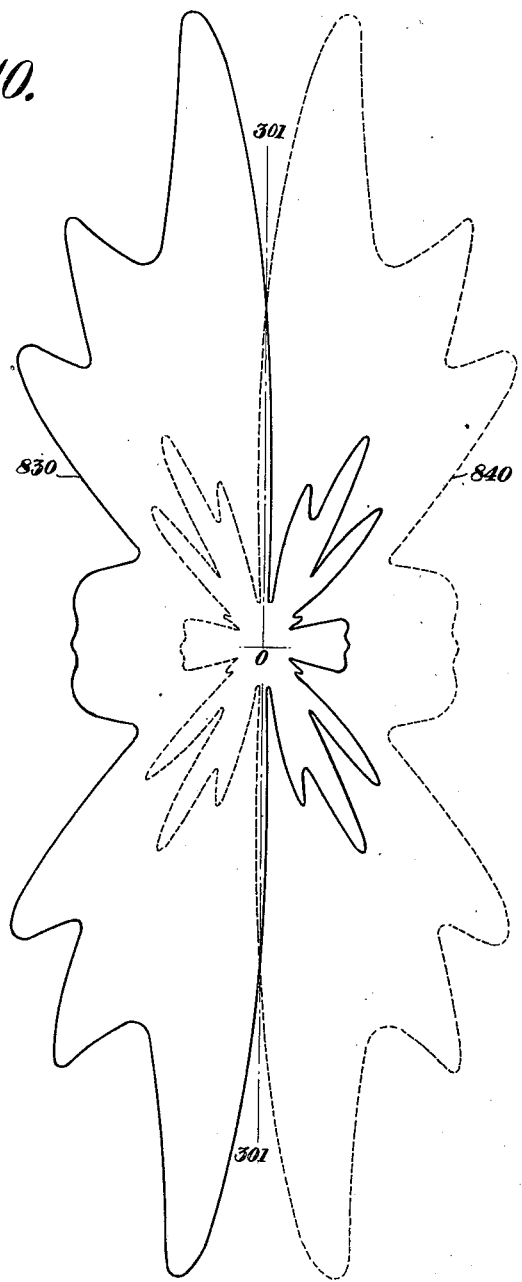

Patented July 23, 1946

2,404,400

UNITED STATES PATENT OFFICE 2,404,400

RADIO BEACON

Sidney B. Pickles, Jackson Heights, N. Y., assignor to Federal Telephone and Radio Corporation, New York, N. Y., a corporation of Delaware Application November 15, 1943, Serial No. 510,267

17 Claims. (Cl. 250—11)

This invention relates to radio beacons and more particularly to antenna arrays for producing radiation patterns suitable for use in radio beacons.

For the purpose of producing radio beacons for guiding a craft along a given course or along a line for landing, it is often desired to produce radiation patterns that will give sharp indications upon departure from course. This sharp indication should be produced without creating false courses, and at the same time preserving a desired difference in energy level at all points about the radiation patterns.

Systems with this object in mind have heretofore been proposed, as, for example, in an application of Andrew Alford, Serial No. 316,732, filed February 1, 1940, entitled "Glide path beacon," and an application of Armig G. Kandoian, Serial No. 381,955, filed March 6, 1941, entitled "Method and means for controlling horizontal patterns for glide paths."

It is an object of my invention to provide an antenna system and energizing circuit to produce desired radiation patterns with a minimum of antenna radiation elements.

It is a further object of my invention to produce an improved radio beacon system of the desired course sharpness.

It is a still further object of my invention to provide a method of energizing antenna units of an array to produce a desired highly directional radiation pattern.

It is a still further object of my invention to provide a system for energizing antennas arranged in an unsymmetrical array to produce a desired radio beacon pattern.

A still further object of my invention contemplates a method of feeding the antenna units of an array to provide a desired distribution pattern.

According to a feature of my invention, at least two antenna means are provided, one of these antenna means being energized from a radio frequency source modulated with a desired signal frequency, and the other of the antenna means being energized with side band energy of the same signal frequency. The spacing between the antennas and the energy fed thereto is adjusted so that a desired distribution pattern is produced. Either or both of the antenna means may be directive antennas and may be a plurality of antenna units or a single unit, as desired. The energy fed to the antennas may be adjusted alternately in phase relationship or may be applied simultaneously to both antenna means with such combined phase relationships that effectively two overlapping radiation fields are produced, serving to form an equi-signal beacon indication.

A better understanding of my invention and the objects and features thereof may be had from the description of several specific embodiments thereof made with reference to the accompanying drawings, in which:

Fig. 3 is a radiation field pattern produced by a beacon arrangement of the type shown in Fig. 2;

Fig. 5 is a modification of my invention illustrating in block diagram an antenna array of three units to be used with the transmitter equipment of Figs. 2 or 4;

Fig. 6 is a radiation field pattern diagram which may be produced by a beacon such as shown in Fig. 5;

Fig. 7 is a radiation field pattern diagram produced by a conventional three unit antenna array;

Fig. 8 illustrates in block diagram a further modification of my invention using six antennas in an array, Fig. 9 is a radiation field pattern diagram which may be produced by a system such as illustrated in Fig. 8; and Fig. 10 is a radiation field pattern produced by the system shown in Fig. 8 when the antennas are not equipped with reflectors.

Figure 1:
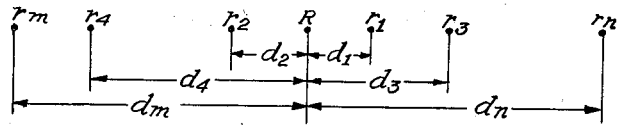
Fig. 1 illustrates a generalized antenna array used for explaining the principles of my invention.

Turning first to Fig. 1, there is shown an antenna array consisting of a first or reference antenna unit R. Arranged in line with R are a plurality of antenna units $r_1$, $r_2$, $r_3$, $r_4$, $r_n$, $r_m$, spaced at distances from R, of $d_1$, $d_2$, $d_3$, $d_4$, $d_m$, $d_n$, respectively. With such an arrangement the total radiation $R_t$ at any angle $\theta$ from the array may be expressed as the sum of the radiations from the various units at this point. Thus, the total radiation can be determined from the equation:

(1) $R_t = R(\theta) \sin \omega t + r_1(\theta) \sin (\omega t + d_1 \sin \theta + \psi)$
$+ r_2(\theta) \sin (\omega t - d_2 \sin \theta - \psi)$
$+ r_3(\theta) \sin (\omega t + d_3 \sin \theta + \psi)$
$+ r_4(\theta) \sin (\omega t - d_4 \sin \theta - \psi)$
$+ r_m(\theta) \sin (\omega t + r_m \sin \theta + \psi)$
$+ r_m(\theta) \sin (\omega t - d_m \sin \theta - \psi)$ where $\psi$ represents the phase of the energy supplied to the separate radiators, $d_1$, $d_2$, represent the spacings illustrated in Fig. 1, $t$ represents time, and $\omega$ is $2\psi$ times the frequency of operation. For best operation of the system as a radio beacon the phase of the energy, generally sideband energy only, in the auxiliary radiators on both sides of R ($\theta$) is made equal to 90°. Making this substitution in the equation above and rearranging the terms to relate all the sine and cosine terms in separate parts thereof, the equation reduces to:

(2) $R_t(\theta) = \sin \omega t [R(\theta) + r_1(\theta) \sin (d_1 \sin \theta)$
$+ r_2(\theta) \sin (d_2 \sin \theta) + r_3(\theta) \sin (d_3 \sin \theta)$
$+ r_4(\theta) \sin (d_4 \sin \theta) + r_m(\theta) \sin (d_m \sin \theta)$
$+ r_n(\theta) \sin (d_n \sin \theta)] + \cos \omega t [-r_1(\theta) \cos (d_1 \sin \theta)$
$+ r_2(\theta) \cos (d_2 \sin \theta) - r_3(\theta) \cos (d_3 \sin \theta)$
$+ r_4(\theta) \cos (d_4 \sin \theta) - r_n(\theta) \cos (d_n \sin \theta)$
$+ r_m(\theta) \cos (d_m \sin \theta)]$ In this equation the sine terms generally represent the wanted energy for radiation from the system and the cosine terms, the unwanted energy at right angles thereto. Some of the terms in the cosine expression are negative due to the positioning of the units on opposite sides of central unit $R\theta$. Thus, the resultant cosine term tends to reduce in magnitude by spacing of units on opposite sides of the central radiator. The principles of the disclosure, however, are not limited to this arrangement with radiators on opposite sides and the generalized array may be used if all of the antenna units are spaced on the same side thereof. However, such an arrangement of the antennas has a large quadrature component "on course" ($\theta$ equal to zero) resulting in a high signal level. Thus, the variation in signal due to the sine terms varying with $\theta$ in the vicinity of zero is a much smaller percentage of total signal variation resulting in a dull course.

In accordance with my invention, the central radiator $R\theta$ may be energized with carrier frequency modulated with a predetermined signal and the side radiators $r_1$, $r_2$, etc., may be energized with sideband energy preferably arranged in a phase at 90° to the sideband energy of the central radiator. With such an arrangement, a desired sharpness of field pattern shape may be obtained with a smaller number of antenna units than is necessary for comparable sharpness in a completely symmetrical array, for example, of the type disclosed in a patent to A. Alford, No. 2,293,694, issued August 25, 1942.

Figure 2:
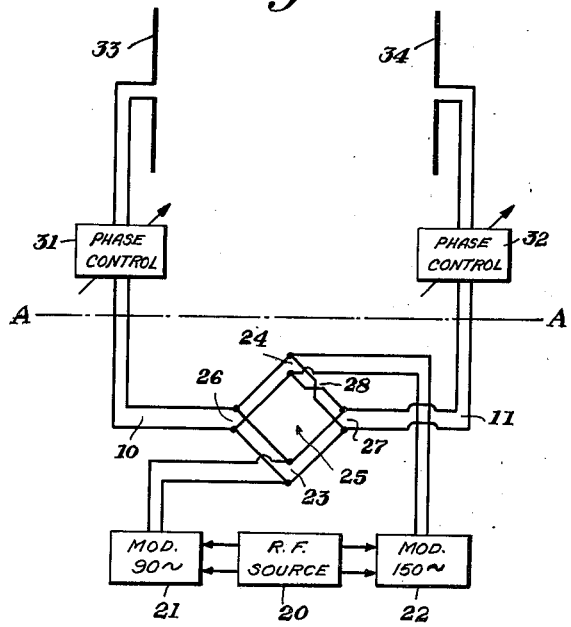
Fig. 2 illustrates in block diagram a simple two element radio beacon incorporating the principles of my invention.

In Fig. 2 is illustrated by way of example the simplest form of antenna array constructed in accordance with the principles of my invention. This array is shown associated with the energizing circuits for a radio beacon in which is provided a source of radio frequency energy 20 which supplies carrier frequency to separate modulators 21 and 22. These modulators serve to modulate the radio frequency carrier energy with desired signals, for example, 90 and 150 cycle signals, as in the usual conventional radio beacons. The modulators may be of any desired form, such as mechanical or electronic modulators, as known in the art. Energy from modulator 21 is applied at terminal 23 of a bridge 25 and energy from modulator 22 is applied at the diagonally opposite terminal 24 of bridge 25. Since the arms of bridge 25 are equal in length, the carrier frequency energy and the sideband energy from modulators 21 and 22 will combine in phase at the junction of line 10 with bridge 25 at terminal 26 to furnish to antenna 33 over phase control unit 31 carrier frequency energy provided with sideband energy from modulators 21 and 22.

At the same time, bridge 25 supplies at its terminal junction 27 with line 11 only sideband energy since the carrier is balanced out because of the transposition 28 in one arm of bridge 25. At the same time, the sideband energy from modulator 22 is reversed in phase with respect to the same sideband fed antenna 33 over line 10. Thus, line 11 supplies antenna 34 over phase control unit 32 sideband energy components, only, one of which is reversed in phase with respect to the corresponding component fed in at 33. Because of the phase relationships, the sideband energy from 21 radiated from antenna 34 will add in certain directions to that radiated from antenna 33, while the sideband energy from 22 radiated from antenna 34 will subtract from the corresponding sideband energy in 33 in the same directions.

Phase control unit 32, phase control unit 31, or both, may then be adjusted to produce in antenna 34 the desired phase relationship of the energy with respect to that in antenna 33 so that the desired pattern distribution will be obtained. It is generally preferred to make this adjustment such that the sidebands in antennas 33 and 34 are in phase quadrature relationship. However, the parasitic or re-radiation effect of antenna 34 with respect to energy from antenna 33 may not be that desired to produce the wanted pattern of carrier energy. To secure the desired effect, phase control unit 31 is provided in line 10. However, adjustment of either control unit 31 or control unit 32 by itself would tend to disturb the sideband pattern already achieved by the first adjustment of control unit 32.

Accordingly, in order to provide the desired parasitic action of antenna 34, the two phase control units 31 and 32 may both be adjusted equal amounts. In the preferred case, control 32 is so adjusted that the line 11 will produce with antenna 34 such an impedance that there will be substantially no parasitic action. The carrier radiation pattern will then be substantially the same as if antenna 33 were acting alone. By the adjustment of phase and impedance in the beacon circuit, the desired distribution patterns may be obtained.

A typical pattern obtainable from the circuit arrangement of Fig. 2 is illustrated in Fig. 3. In this figure, we may, for example, assume that pattern 330 is produced by the resultant radiation of sidebands and carrier from modulator 21, and the pattern 340 is the corresponding pattern from the modulator 22. The courses defined by this beacon will be that indicated by 1—0—1 in the drawings. The patterns illustrated in Fig. 3 represent two antenna units such as shown in Fig. 2 spaced apart a distance of 170°. A course sharpness for a radio range or localizer beacon of .44 db./1.5 departure from course is obtained by this system.

Figure 4:
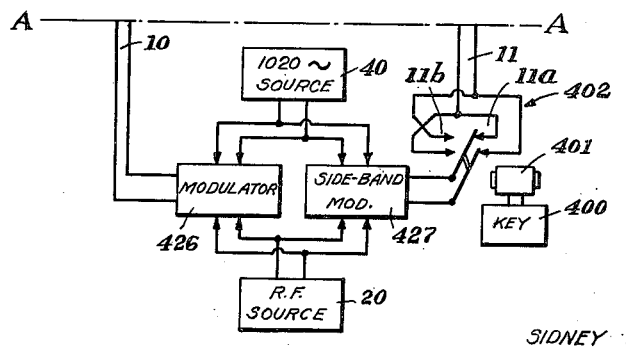
Fig. 4 is a block diagram of an alternative beacon energizing system which may be substituted for that shown in Fig. 2 and in other figures, later to be described.

Instead of the simultaneous energization of both antenna units as shown in Fig. 2, the circuit elements below line A—A of that figure may be replaced by the circuit of Fig. 4. In this arrangement, carrier source 20 is coupled to separate modulators 426 and 427. Modulator 426 being an ordinary straight modulator and modulator 427 a sideband modulator, for example, of the balanced modulator type. Signal energy of any desired audio frequency, for example, 1020 cycles per second, is supplied to modulators 426 and 427 from audio frequency source 40. Energy from 426 may be supplied over line 10 to the antenna unit such as shown at 33 of Fig. 2. The sideband modulation energy from 427, however, is fed over a switch element 402 alternately positioned against contacts 11A and 11B by means of a keyer 400 and a keying relay 401. Thus, the sideband energy supplied to line 11 and from units to antenna 34 is alternately reversed in phase so that it will alternately add and subtract in the same directions from the sideband energy radiated from the antenna 33. This will produce alternate radiation patterns of the type shown at 330 and 340 of Fig. 3.

Still another modification of my invention utilizing three antenna units is shown in Fig. 5. In this arrangement, the antenna units may be coupled to the corresponding lower portion of Fig. 2 or to the keying arrangement shown in Fig. 4, as indicated by line A—A. In this figure the antennas have been shown as high frequency loop antennas instead of vertical dipoles as in the case of Fig. 2. It should be understood, however, that the antenna units in this and other modifications are interchangeable at will and the particular type used has no bearing on the principles of my invention as such.

The modulated carrier energy is supplied over the line 10 and phase control unit 31 to antenna unit 534, as in the cases previously described. The sideband energy from line 11, however, is applied to the two separate antenna units 533 and 533A over a branched line and amplitude control units 501, 502, respectively, and phase control units 532, 532A, respectively. Since, in this arrangement, the sideband energy is fed to separate units, the amplitude of energy in these units may be adjusted relative to one another and to the central antenna unit without upsetting the impedance match of the system and causing cross modulation. In order to match the entire sideband antenna system to line 11, a matching section 500 may be provided.

In this case, as in the simpler case shown in Fig. 3, the phase of the energy in antenna units 533 and 533A with respect to central antenna unit 534 may be suitably adjusted to produce the desired pattern. Also, the amplitude may be controlled, as desired, to still further control the pattern form. Thereafter, the phase control of the units may be adjusted so that antenna 534 does or does not parasitically affect either of the other units, as desired. This three element array may provide a radio beacon which is very sharp, as shown in the pattern of Fig. 6. The two overlapping patterns 630 and 640 representing the two resultant patterns define a course line 101—0—101. In the particular example chosen for illustration, the spacing between antennas 534 and 533 is 210° while that between antennas 534 and 533A is 450°. The carrier current present in the central antenna unit 534 is at a relative level of .96, while that of 533 is .3 and that of 533A is .1. The sideband energy present in the antenna units is in the ratio of .12, .81 and .575, for antenna units 534, 533 and 533A, respectively. This gives a sharpness of about 4 decibels per degree and one half departure from course, but does not provide a very large clearance, L, between the minor lobes of the patterns and the adjacent minima thereof. It is clear, however, that by sacrificing a small percentage of the sharpness, this clearance can be readily increased while still maintaining considerable advance of course sharpness.

A corresponding radiation pattern for a symmetrical three unit antenna array of the type described in the aforementioned A. Alford patent in which the side radiators are spaced 160° from the central radiating unit is shown in Fig. 7. In this figure, the two patterns 730 and 740 define a course 201—0—201. With this array the sharpness is only 1.26 decibels per degree and one half departure from course compared to the much greater sharpness shown in the example of Fig. 6. It is, therefore, clear that the arrangement in accordance with my invention enables the production of courses which are much sharper than those formed by the symmetrical antenna arrays with the same number of units.

A still further embodiment of my invention utilizing six antenna units is shown in Fig. 8. In this figure, as in the case of Fig. 5, the energizing circuits are not shown but may be connected along line A—A from either Fig. 2 or Fig. 4. Furthermore, in the arrangement of Fig. 8, the effect of small clearance between the minor lobes of one pattern and a minimum of the other pattern is avoided by providing a central symmetrical array, associated with a plurality of other unsymmetrically arranged antenna units. The carrier frequency energy modulated with the desired sideband energy is applied over line 10 and phase control unit 31 to a central antenna 801. Equally spaced on opposite sides of antenna 801 are provided two symmetrical sideband antenna units 802, 803 coupled to line 11 over a tie line provided with a transposition 810, a phase control unit 834 and an amplitude control unit 844. In addition, the unsymmetrically arranged sideband units 804, 805 and 806 are coupled to line 11 over phase shifting control units 831, 832 and 833, respectively, and amplitude control units 841, 842 and 843, respectively. In this system, as in the other systems, the amplitude and phase of the units may be adjusted in the manner previously described to secure the desired radiation pattern.

It is often desired to make the radiation of beacon patterns unsymmetrical so that the back course will be much lower in amplitude than the front course produced. To this end reflector units 811, 812, 813, 814, 815 and 816 may be provided, spaced substantially one quarter of a wavelength behind the corresponding antenna units 801 to 806. These reflectors may be tuned to provide the desired reflecting action by tuning lines 821 to 826, respectively. A stub line section 800 may be provided across line 11 to match the entire sideband antenna system to the line so that balance at the feeding bridge will be maintained.

A typical radiation pattern produced by a beacon such as shown in Fig. 8 but without the reflector units, is illustrated in Fig. 10. In this figure, the two overlapping patterns are shown at 830 and 840 defining a very sharp guide line 301—0—301. To produce this pattern, the spacing between the various units is as follows: Units 802 and 803 are each spaced 160° from 801; unit 804 is spaced at 495° and unit 805 at 1170° from 801; unit 806 is spaced at 800° from 801. The magnitude of energy supplied to the sideband radiators is as follows: to antennas 802 and 803, .5; to antenna 804, .45; to antenna 806, .448; and to antenna 805, .310. This current distribution among these separate radiators is obtained, as explained above, by adjustment of the amplitude control units 841 to 844.

Many other types of antenna arrays for achieving the desired operation in accordance with the principle of my invention will be clearly obvious to the expert in the art from the general principles thereof outlined above. Many modifications may be made other than those illustrated in the few examples given without departure from the scope of my invention, and it should be definitely understood that while in all cases illustrated the central or carrier radiating unit has been shown as a single antenna, an array may be used in its stead, if desired.

Likewise, any one of the other antenna units or all of them may be replaced by arrays of antennas, if desired, or by any type of radiator. The directive effect of the entire array may be altered by changing the directional characteristics of the individual units and these functions may all be readily calculated in accordance with the equations given in the early part of specification, taking into consideration the shape factor of each radiation pattern as well as the phase and amplitude relations therein.

It should be definitely understood that the examples given above are merely illustrative of my invention as set forth in the objects of the invention and in the appended claims.

What is claimed is:

1. A directive antenna system for producing a directive radiation pattern of a predetermined form, comprising at least two antenna means, a source of carrier energy modulated with a given signal, a source of sideband energy of said combined carrier and signal frequencies, first means for applying energy from said signal modulated carrier source to one of said antenna means, second means for applying said signal sideband energy to another of said antenna means, means for adjusting the relative phase of energy fed to said two antenna means to a desired value, and means for adjusting the effective electrical length of said two antenna means to produce the desired parasitic effect of said other antenna means with respect to said one antenna means, while maintaining said relative phase adjustment constant.

2. A directive system according to claim 1, wherein said other antenna means comprises a plurality of antenna means arranged in a line with said one antenna means and in unsymmetrical spaced relation with respect thereto.

3. A directive antenna according to claim 1, wherein said other antenna means comprises a plurality of antennas arranged in a line with said one antenna means and in unsymmetrical spaced relation with respect thereto, further comprising means for adjusting the amplitude of energy in said antennas relative to one another and to the energy in said one antenna means.

4. A directive antenna system according to claim 1, wherein said signal comprises two different frequency tones, said source of signal modulated energy comprising means for modulating said carrier with both said tones to provide said signals modulated carrier, and said source of signal sideband energy comprising means for producing sideband energy of said two signals with one of said signals reversed in phase with respect to the corresponding modulating signal on said carrier.

5. An antenna system according to claim 1, further comprising means for alternately reversing in phase the energy in supplied said other antenna means, whereby alternate overlapping patterns are provided to define a beacon course line.

6. In a directive antenna system having a first antenna means, and a second antenna means spaced therefrom and coupled thereto, the method of providing a desired radiation pattern, comprising supplying to said first antenna means signal modulated carrier frequency energy, supplying to said second antenna means signal sideband energy, adjusting the phase of energy supplied to said second antenna means to a desired phase relation with respect to energy in said first antenna means, and adjusting the effective lengths of paths for energy supplied to said first and second antenna means to adjust the effective impedance of said second antenna means with respect to energy radiated from said first antenna means to provide the desired parasitic action of said second antenna means with respect to energy from said first antenna means.

7. A radio beacon system comprising, a source of signal modulated carrier energy, a source of signal sideband energy, a first antenna means, a second antenna means spaced from said first antenna means, first coupling means for coupling said source of signal modulated energy to said first antenna means, second coupling means for coupling said source of signal sideband energy to said second antenna means, means for adjusting the relative phase of energy in said first and second antenna means to a desired value, and for adjusting the effective electrical lengths of said first and second coupling means to control the parasitic effect of said second antenna means with respect to said first antenna means, and means for controlling the phasing of said sideband energy supplied to said second antenna means with respect to the sideband energy of said signal modulated carrier energy to provide two effectively overlapping radiation patterns, defining a desired course line.

8. A radio beacon system according to claim 7 wherein said last named means comprises, a source of carrier frequency energy, means for separately modulating said carrier frequency energy with two distinctive signals, and a bridge network coupled to said modulating means to combine in phase coincidence the modulated carrier energy from said modulating means at one terminal and to combine in phase opposition the modulated carrier energy from said modulating means at another terminal.

9. A radio beacon system according to claim 7, wherein said source of signal modulated energy comprises a high frequency energy, a source of signal frequency energy, and a modulator for modulating said high frequency energy with said signal energy, said source of sideband energy comprises means for producing sidebands from said high frequency energy and said signal energy, and said means for controlling the phasing of said sideband energy comprises switch means for alternately reversing the phase of said sideband energy supplied to said second antenna means.

10. A radio beacon system according to claim 7, wherein said second antenna means comprises a plurality of antennas arranged in spaced relation with respect to said first antenna means.

11. A radio beacon system according to claim 7, wherein said second antenna means comprises a plurality of antennas arranged in spaced relation with respect to said first antenna means, in combination with means for adjustably controlling the energization level of energy in said antennas with respect to one another and to said first antenna means.

12. A radio beacon system according to claim 7, wherein said second antenna means comprises a plurality of antennas arranged substantially in line with said first antenna means and in unsymmetrical spaced relation with respect thereto.

13. A radio beacon system according to claim 7, wherein said second antenna means comprises a plurality of antennas arranged substantially in line with said first antenna means on opposite sides thereof and in unsymmetrical spaced relation with respect thereto.

14. A radio beacon system according to claim 7, wherein said second antenna means comprises a plurality of antennas arranged substantially in line with said first antenna means on opposite sides thereof, two of said antennas being spaced symmetrically on opposite sides of said first antenna means and having means for energizing them in phase opposition with respect to one another, and the remaining of said antennas being spaced unsymmetrically with respect to said first antenna means.

15. A radio beacon system comprising a first antenna means, a second antenna means comprising a plurality of antennas arranged substantially in line with said first antenna means and in unsymmetrical spaced relation with respect thereto, a source of signal modulated carrier energy, a source of signal sideband energy, means for coupling said source of signal modulated energy to said first antenna means, and means for coupling said source of sideband energy to said second antenna means.

16. A radio system comprising a first antenna means, a second antenna means, comprising a plurality of antennas arranged substantially in line with said first antenna means on opposite sides thereof and in unsymmetrical spaced relation with respect thereto, a source of signal modulated carrier energy, a source of signal sideband energy, means for coupling said source of signal modulated energy to said first antenna means, and means for coupling said source of sideband energy to said second antenna means.

17. A radio beacon system comprising a first antenna means, a second antenna means comprising a plurality of antennas arranged substantially in line with said first antenna means on opposite sides thereof, two of said antennas spaced symmetrically on opposite sides of said first antenna means and having means for energizing them in phase opposition with respect to one another and the remaining of said antennas being spaced unsymmetrically with respect to said first antenna means, a source of signal modulated carrier energy, a source of signal sideband energy, means for coupling said source of signal modulated energy to said first antenna means, and means for coupling said source of sideband energy to said second antenna means.

SIDNEY B. PICKLES.